United States Patent [19]

Barabas

[11] 4,259,465

[45] Mar. 31, 1981

[54] BIMODAL COEXTENDANT SUSPENSION POLYMERIZATION SYSTEM

[75] Inventor: Eugene S. Barabas, Watchung, N.J.

[73] Assignee: GAF Corporation, New York, N.Y.

[21] Appl. No.: 901,692

[22] Filed: May 1, 1978

[51] Int. Cl.³ .................... C08F 2/18; C08F 4/34; C08F 120/00; C08F 120/10

[52] U.S. Cl. .................... 526/65; 526/66; 526/80; 526/81; 526/88; 526/212; 526/227; 526/264; 526/303; 526/317; 526/328.5; 526/909; 526/910; 528/502

[58] Field of Search .............. 526/264, 227, 303, 212, 526/80, 81, 65, 909, 910, 317, 88, 66, 328, 328.5; 260/901; 528/502

[56] References Cited

U.S. PATENT DOCUMENTS

| | | | |
|---|---|---|---|
| 3,051,682 | 8/1962 | Ott | 526/910 |
| 3,153,640 | 10/1964 | Barnum et al. | 526/265 |
| 3,218,302 | 11/1965 | Melamed | 526/264 |
| 3,252,949 | 5/1966 | Fields et al. | 526/264 |
| 3,377,323 | 4/1968 | Ioka et al. | 528/502 |
| 3,776,892 | 12/1973 | Bueyle | 526/303 |
| 3,840,489 | 10/1974 | Strazdins | 526/303 |
| 3,862,091 | 1/1973 | Barabas et al. | 526/264 |
| 3,899,461 | 8/1975 | Barabas et al. | 526/264 |
| 3,899,471 | 8/1975 | Lorenz et al. | 526/264 |
| 3,910,862 | 10/1975 | Barabas et al. | 526/264 |

FOREIGN PATENT DOCUMENTS

| | | | |
|---|---|---|---|
| 682452 | 3/1964 | Canada | 526/317 |
| 1251025 | 9/1967 | Fed. Rep. of Germany | 526/317 |
| 1233064 | 5/1971 | United Kingdom . | |

*Primary Examiner*—Joseph L. Schofer
*Attorney, Agent, or Firm*—Walter C. Kehm; Marilyn J. Maue

[57] ABSTRACT

The binary suspension polymerization of a water soluble monomer and an organophilic or hydrophobic monomer having a low Tg in an integrated aqueous suspension system wherein the suspension medium for said organophilic monomer droplets comprises a hydrophilic monomer having a higher rate of reaction than the hydrophobic monomer and water in a mixture such that a solution of between about 1,000 and about 100,000 cps Brookfield viscosity is maintained in the reaction zone during polymerization of the organophilic droplets.

14 Claims, No Drawings

BIMODAL COEXTENDANT SUSPENSION POLYMERIZATION SYSTEM

BACKGROUND OF THE INVENTION

The disadvantages encountered in certain types of polymerization procedures, viz., difficult heat control in bulk polymerization, and the low molecular weight products, slow reaction, and product impurity due to the presence of traces of solvents in solution polymerization, are all successfully overcome by suspension polymerization in an aqueous medium. Notwithstanding these advantages, many polymers, such as the long hydrocarbon chain containing polyacrylates, or vinylesters etc. having low Tg (i.e. second order transition temperature), e.g. below −45° C. have not been prepared in this manner for the reason that droplets of their respective monomers collapse upon contact and agglomerate in a large mass which prevents heat removal and terminates the polymerization. This effect with monomers having a Tg less than −45° C. is not avoided by high mechanical agitation or by the use of suspension aids since the walls of the droplets are not sufficiently strong to withstand normal impact. For this reason, monomers of low Tg have been reacted by bulk, solution or emulsion methods when polymerization is desired. The presence of emulsifiers and other chemicals in the reaction mixture produces a less desirable product since the small amounts of such ingredients necessary for a successful course of reaction are occluded inside the agglomerated polymer and can not be easily removed by the best of washing procedures. The only way to obtain pure polymer product formed by such processes involves repeated dissolution and reprecipitation of the coagulated product, which procedure is not economically feasible in industrial operations.

Accordingly, it is an object of the present invention to provide a method for polymerizing monomers having a low Tg by the suspension method in a unique aqueous suspension medium.

It is another object of the present invention to provide an economic and commercially feasible process for obtaining high molecular weight polymers of low Tg monomers.

Another object of this invention is to simultaneously produce separate and distinct homopolymers of organophilic and hydrophilic monomers in a high state of purity.

Another object is to provide a suspension polymerization process which achieves economical separation and recovery of the simultaneously produced organophilic and hydrophilic homopolymers.

These and other objects of this invention will become apparent from the following description and disclosure.

THE INVENTION

According to the present invention there is provided an improved process for polymerizing organophilic monomers having a Tg less than about −45° C. by dispersing droplets of said monomers in an aqueous hydrophilic monomeric solution which achieves a Brookfield viscosity of between about 1,000 and about 100,000 cps, preferably between about 5,000 and about 30,000 cps. during polymerization of the organophilic monomer species. The present suspension process eliminates the need for hydrocarbon solvents and suspension aids which may contaminate polymeric product.

The hydrophilic monomer is initially introduced into the reaction zone during the induction stage of the present process, i.e. below initiation temperature of the hydrophilic species and/or before introduction of catalyst, at a viscosity lower than that achieved after initiation when the hydrophilic species has begun to polymerize. This is essential in the present process since the lower initial viscosity of the hydrophilic monomer, e.g., a viscosity desirably less than about 2,000 cps, preferably between about 5 and about 500 cps. allows the droplets of organophilic monomer to form; whereas after initiation, the higher viscosity of the polymerizing hydrophilic species is needed to prevent agglomeration of the polymerizing hydrophilic species is needed to prevent agglomeration of the polymerizing organophilic species.

The concentration of the hydrophilic species in water which forms the suspension polymerization medium of this invention is maintained between about 10 and about 50 wt %, preferably between about 20 and about 35 wt % of the hydrophilic species. Such concentrations provide the critical viscosity of the present aqueous suspension medium. The hydrophilic monomer employed in the present invention is advantageously selected from among those having a high rate of reaction, or at least a rate of reaction substantially higher than that of the organophilic monomer species of the reaction, so as to provide the viscosities necessary for droplet formation and prevention of droplet agglomeration of the organophilic species.

Preferred examples of such hydrophilic monomers include amido-containing monomers, such as acrylamide, methacrylamide, dimethylamino ethylacrylamide, N-vinyl-2-pyrrolidone, N-vinyl-caprolactam, N-vinyl-2-oxazolidinone, etc.; monomers having olefinic unsaturation adjacent to a carboxyl group such as acrylic acid, methacrylic acid, etc. and mixtures thereof. Of this group, acrylamide and N-vinyl pyrrolidone are preferred species.

The organophilic or hydrophobic monomers of this invention, having relatively low Tg which are suspended as droplets in the present reaction medium include polymerizable esters such as butylacrylate, pentylacrylate, 2-ethylhexylacrylate, octylacrylate, stearylacrylate, dodecylacrylate, decylacrylate, laurylmethacrylate, stearylmethacrylate, and other similar water insoluble monomers and mixtures thereof. Of the above group, butyl-, pentyl-, and 2-ethylhexylacrylates are preferred and butylacrylate or 2-ethylhexylacrylate are most preferred.

It is to be understood that combinations of monomers within the above organophilic and hydrophilic classes can be employed in the present suspension polymerization reaction when copolymerization or interpolymerization of the organophilic monomers and/or copolymerization or interpolymerization of the hydrophilic monomers is desired. The ratio of hydrophilic monomer to organophilic monomer may vary within the range of between about 95:5 and about 20:80, but more usually is maintained between about 70:30 and about 35:65 parts by weight.

The operating conditions of the present suspension polymerization include a temperature of from about 50° C. to about 170° C., preferably 60° C. to about 110° C., a pressure of from atmospheric to 25 atmospheres and a reaction time of from about 20 minutes to about 8 hours. Preferably atmospheric pressure is employed and the reaction is conducted over a period of from about 45 minutes to about 5 hours. The catalysts or polymerization initiators employed in the present invention are those conventionally used and are preferably those free radical, organo-soluble types such as the peroxides, namely benzoyl peroxide, peroxypivalate, t-butyl peroxide, t-butyl peracetate and azo catalysts such as azobisisobutylonitrile, dimethyl azobisisobutyrate; although it is to be understood that other catalysts such as hydrogen peroxide, urea peroxide, potassium persulfate, sodium perborate, cumene hydroperoxide and other free radical catalysts can be employed if desired. Generally, the catalyst is employed in an amount between about 0.01 wt % and about 5 wt % based on monomers. The pH of the reaction is maintained under substantially neutral or basic conditions.

The organophilic monomer of the present invention preferably possesses a Tg between about $-50°$ C. and about $-100°$ C.; said Tg representing the second order transition temperature at which the droplets in the polymerization reaction become rubbery or tacky. Thus, below about $-45°$ C. Tg, the suspended droplets are glassy spheres whereas above said temperature, e.g. reaction temperatures, the droplets soften and become tacky. When the hydrophilic monomer species is omitted and the reaction medium consists solely of water containing suspension aids, Brownian Movement in the system causes the droplets to collide at a temperature above the critical Tg so that mechanical agitation and suspension aids are no longer able to prevent agglomeration of the droplets as the globule walls collapse and the droplets coagulate. This effect becomes more pronounced as the polymer chain grows. Such agglomeration prevents removal of heat generated by the reacting species and concomitant termination of the polymer chains resulting in low molecular weight impure polymer. Because of the softness of the globule wall, it is possible for an amount of the suspension aid to enter the droplet and contaminate the resulting product formed as an agglomerated mass. As pointed out above, washing and purification difficulties associated with such processes present severe economical and commercial difficulties.

When the improved polymerization medium of the present invention is employed, the hydrophilic polymerizing species acts as a barrier against coalescence of the organophilic droplets and maintains the suspension of said droplets so that a discrete bead-like or particulate polymeric particles are formed. Maintenance of the suspension allows for the formation of higher molecular weight polymers which are obtained in a purity up to 85% and often greater than 90%.

The reaction of the present invention achieves between about 80% and 100% conversion of both organophilic and hydrophilic monomer species, and the organophilic polymer is generally recovered as a white or opaque granular product by filtration of the polymeric granules from the aqueous solution of the hydrophilic polymeric product which is simultaneously formed during the reaction. Polymers of the organophilic species comprise between about 100 and about 10,000 monomeric units, more usually between about 500 and about 5,000 units; whereas the polymer of the hydrophilic species comprise between about 500 and about 10,000 monomeric units, more often between about 1,000 and about 5,000 monomeric units. Notwithstanding the differences in reaction rates, Brownian movement in the reaction zone may cause a small number of the droplets of hydrophobic monomer to come in contact with molecules of water soluble monomer. Accordingly, the polymeric product may contain 0 to 25% of hydrophylic segments.

Generally it is recommended, as a preferred method of carrying out the suspension polymerization of the present invention, that the mixture of hydrophilic monomer, or mixture of hydrophilic monomers, and water be prepared in the desired concentration to form the suspension medium and the organophilic monomer, or mixture of organophilic monomers, be gradually added to this suspension medium. Mechanical agitation is provided to disperse the droplets in the medium during the induction period.

In the induction period, little polymer is formed and the viscosity of the liquid droplets changes only slightly. It has also been found beneficial to reduce the number of droplets, by adding a portion of the organophilic monomer species in one or more incremental amounts after initiation. In this way the subsequently added organophilic monomer is imbibed in the existing droplets. Collision and coalescence of the globules is prevented both by the mechanical agitation and by the increasing viscosity of the polymerizing hydrophilic monomer or hydrophilic monomer mixture. After initiation, the organophilic polymer begins to form within the boundries of the droplet and the droplets or globules become very viscous and sticky, but remain intact because of the increasingly viscous medium which serves as a barrier against collision. Since polymerization is confined within the droplet, impurities are excluded and a particulate polymeric product is formed.

The size of the droplets or globules in the reaction medium depend on the interfacial tension between the solution and the droplet wall and can be somewhat altered by the addition of between about 0.5 and about 20.0 wt %, of an electrolyte such as sodium chloride, ammonium sulfate, potassium sulfate, sodium sulfate, etc. The high interfacial tension between the solution and the droplet of the present invention provides a smaller droplet size, than that which normally results from a low interfacial tension. The average size of the polymeric particles is between about 0.1 mm and about 3.0 mm.

After the reaction is complete, two separate polymeric products can be simultaneously recovered in the following manner. The reaction mixture is diluted, preferably with water, to a 2 to 10 fold volume, and the resulting mixture may be filtered or passed through a sieve to retain and separate the organophilic polymeric granules. Alternatively, the polymer granules may also be separated by sedimentation. The granules are then washed with water, dried and recovered.

The filtrate is collected and the polymeric product contained therein is recovered by removal of water e.g., by evaporation, distillation or spraydrying or by another conventional method.

The viscosity of the reaction medium can be somewhat altered by introducing a chain transfer agent, such as a chain transfer alcohol or a mercaptan in an amount between 0 and about 10 wt % based on hydrophilic monomer. During reaction, if the suspension medium becomes too viscous or more viscous than is necessary to prevent collision of the droplets, additional water can be introduced into the reaction zone, with or without simultaneous withdrawal of an equal portion of the original reaction medium. Most often such adjustment of viscosity is not required; however, this procedure can be employed to maintain the viscosity of the suspension medium within the Brookfield viscosity (cps) ranges set forth above.

Having generally described the present process, reference is now had to the following examples which are provided to illustrate preferred embodiments, but which are not to be construed to be in any way limiting to the scope of the present invention as set forth in the foregoing disclosure and in the appended claims. All amounts and proportions recited in the examples are by weight unless otherwise designated. It is to be understood that any of the organophilic monomers mentioned hereinabove or mixtures thereof can be substituted in either of Examples I or II for the organophilic monomer employed. Similarly, any of the hydrophilic monomers mentioned hereinabove or mixtures thereof can be substituted in either of Examples I or II for the hydrophilic monomer or monomers employed. In all such substitutions, the beneficial effects of the present suspension polymerization are achieved.

EXAMPLE I

A. Into a 5 liter kettle, equipped with mechanical stirrer, reflux condenser, gas inlet tube, thermometer and graduated dropping funnel, was added 1152 g distilled water, 90 g isopropanol and 289.5 g acrylamide, and the mixture stirred until the solution was clear. To this solution 31.3 g butylacrylate and 0.4 g t-butyl peroxy pivalate were added and the system was purged thoroughly with nitrogen. The mixture was then heated to 67° C. with brisk agitation. The butylacrylate appeared as distinct droplets floating in the viscous liquid medium, formed by the aqueous solution of polymerizing acrylamide.

To this heterogeneous liquid was added gradually over a period of 2 hours a mixture consisting of 494 g distilled water, 90 g isopropanol, 289.5 g acrylamide and 31.3 g butylacrylate which was stirred constantly to keep the butylacrylate distributed. The mixture gradually became more and more viscous and the butylacrylate droplets were converted to solid beads during the addition which was completed in two hours. The reaction was allowed to proceed for two additional hours, in order to convert all the unreacted monomers, after which the mixture was diluted to a five fold volume with distilled water. The beads were then filtered from the liquid by passing the resulting mixture through a 100 mesh sieve. The beads were transferred from the sieve into a 1 liter graduated cylinder where they were washed and sedimented three times. Finally most of the water was decanted and the slurry containing the beads was freeze-dried. The product of 90% pure polybutylacrylate homopolymer was a white, particulate solid obtained in 92.0 weight % yield based on butylacrylate monomer.

Analysis: % nitrogen: 1.93%, Average Particle Size: 0.68 mm

The polyacrylamide homopolymer retained in the separated liquid phase is recovered by distilling off water and drying in vacuo. About 98% pure polyacrylamide product is recovered in 78.1 weight % yield based on acrylamide.

B. The above experiment was repeated, except that a total of 300 g. acrylamide instead of the 579 g. employed in Example I was added to the kettle in two equal portions and the addition of isopropanol was omitted. The polybutylacrylate (91%) and polyacrylamide (98%) products were obtained in substantially the same yield.

EXAMPLE II

Into a 2 liter kettle equipped similarly to that described in Example I is introduced, in the manner set forth above, a mixture of 538.7 g distilled water, 42 g isopropanol, 135 g acrylamide, 12 g 2-ethylhexylacrylate and 0.7 g t-butyl peroxy pivalate. The system was constantly agitated and was purged with nitrogen. The temperature was increased to 67° C. at which point the reaction was initiated. During the reaction a peak temperature of 74° C. was reached, the mixture became more viscous, and the beads of 2-ethylhexylacrylate were visably dispersed in the aqueous liquid medium. At this point the addition of a stirred mixture of 230.3 g distilled water, 42 g isopropanol, 81.2 g N-vinyl-2-pyrrolidone, 54.1 g acrylamide and 48 g 2-ethylhexylacrylate was incrementally added over a period of 2 hours to the mixture in the kettle. The mixture was allowed to react for an additional 90 minutes. During this time the beads polymerized completely in the viscous acrylamide/vinylpyrrolidone copolymerizing medium. After the reactions were completed, the system was diluted with 3500 g distilled water and the dilute solution of acrylamide/N-vinyl-2-pyrrolidone copolymer was decanted. The residue beads of poly 2-ethylhexylacrylate was transferred to a 1 liter graduated cylinder wherein they were washed several times with distilled water and then freeze-dried to a white, slightly waxy, particulate poly-2-ethylhexylacrylate product in 89.3 weight % yield and 80.0% purity.

Analysis: Nitrogen %: 3.42%, Average Particle Size: 0.43 mm

The copolymer of the liquid phase is recovered in 81.3 weight % yield and 95.1% purity in the manner described in Example I.

Alternatively, in the above Example, the N-vinylpyrrolidone comonomers can be added initially with acrylamide before or with the addition of 2-ethylhexylacrylate into the reaction kettle.

COMPARATIVE EXAMPLE III

Into a 2 liter kettle equipped similarly to that described in Example I was introduced a 26% aqueous solution of 600 g of 9:1 copolymer of acrylamide/methylmethacrylate to provide a medium having an initial Brookfield viscosity of 22,500 cps. As in Example I, the mixture was stirred and purged with nitrogen, after which 200 g of butylacrylate was added over a period of 20 minutes from a dropping funnel with vigorous stirring. About 0.5 g t-butyl peroxy pivalate was then introduced into the reaction mixture and the system was heated to 80° C. The polymerized butylacrylate, did not form beads, but separated in a large agglomerated mass of polymer which could not be further purified.

The reason for this failure to achieve the benefits of this invention was due to the fact that small droplets of butylacrylate could not form in the initiation stage because of the high initial viscosity of the medium at the introduction of the butylacrylate monomers.

COMPARATIVE EXAMPLE IV

The experiment of Example III was repeated except that a 10% aqueous solution of the hydrophilic copolymer was substituted for the 26% solution to provide a liquid medium of 80 cps Brookfield viscosity. After said addition of 200 g butylacrylate and 0.5 g peroxy pivalate, droplets formed and were dispersed in the medium. The system was then heated to 80° C., for a period of about 30 minutes, after which 200 g of a 26% aqueous solution of 1:9 acrylamide/methylmethacrylate copolymer having a Brookfield viscosity of 22,500 cps was incrementally added in order to more slowly increase the viscosity of the liquid medium.

However, the butylacrylate, as it polymerized in the low viscosity medium, agglomerated into a large soft mass and was not recoverable by economic means.

The reason for this failure to achieve the benefits of the present invention was due to the use of pre-polymerized hydrophilic species in a low viscosity which does not increase after initiation of polymerization of the hydrophobic species. The low viscosity of the medium could not provide a sufficient barrier to slow the Brownian movement, and present coalescence before the viscosity was increased by the addition of 200 g of the 26% aqueous solution.

COMPARATIVE EXAMPLE V

Into a 2 liter kettle equipped similarly to that described in Example I was introduced 600 g of distilled water. The reactor was purged with nitrogen and, over a period of 30 minutes, 70 g butylacrylate, together with 0.5 g t-butyl peroxy pivalate catalyst, was added dropwise with vigorous agitation. The temperature was then raised to 67° C. and an additional 130 g butylacrylate was introduced from the dropping funnel at a rate of 65 g/hr. After about 1 hour the polymers coagulated into a tacky, rubbery mass, which was, from a practical and economic standpoint, substantially unrecoverable.

Again this failure to realize the benefits of the present invention was due to the fact that the surface tension between the medium and monomer droplet was not sufficient to maintain the forming soft polymer particles intact.

What is claimed is:

1. A bimodal co-extendant suspension polymerization process comprising the steps of:
   (a) forming a liquid suspension medium by mixing between about 10 weight % and about 50 weight % of a polymerizable hydrophilic monomer with water to form the liquid suspension medium having a first initial viscosity;
   (b) contacting said suspension medium with droplets of a monomer selected from the group of a polymerizable organophilic monomers having a Tg less than −45° C. under agitation to disperse and suspend said droplets in a heterogeneous mixture;
   (c) reacting said heterogeneous mixture in the presence of a free radical catalyst and maintaining a higher viscosity of the suspension medium than said first initial viscosity, said viscosity of said suspension medium being maintained between about 1,000 and about 100,000 cps during the reaction of said organophilic species, so as to polymerize said organophilic monomer as discrete solid polyorganophilic particles while separately polymerizing said hydrophilic monomer in the aqueous phase as a polyhydrophilic polymer, the selection of said hydrophilic monomer of the suspension medium being such that it possesses a higher rate of reaction than the organophilic monomer;
   (d) separating said particles from said aqueous phase; and
   (e) recovering said solid particles as the organophilic polymer of the process and separately recovering from said remaining aqueous phase the hydrophilic polymer, as the second product of the process.

2. The process of claim 1 wherein step (c) is conducted at a temperature of between about 50° C. and about 170° C. under a pressure of from about 10 psig to about 350 psig in the presence of a peroxide catalyst.

3. The process of claim 2 wherein said organophilic monomer is butylacrylate.

4. The process of claim 2 wherein said organophilic monomer is 2-ethylhexyl acrylate.

5. The process of claim 2 wherein said organophilic monomer is a mixture of butylacrylate and 2-ethylhexyl acrylate.

6. The process of claim 2 wherein said hydrophilic monomer is acrylamide.

7. The process of claim 2 wherein said hydrophilic monomer is N-vinyl pyrrolidone.

8. The process of claim 2 wherein said hydrophilic monomer is a mixture of acrylamide and N-vinylpyrrolidone.

9. The process of claim 2 wherein the peroxide catalyst is t-butyl peroxypivalate.

10. The process of claim 1 wherein between about 30 weight % and about 65 weight % of the organophilic monomer species, based on the hydrophilic monomer species, is employed.

11. The process of claim 1 wherein the concentration of the hydrophilic monomer in water is between about 20 weight % and about 35 weight %.

12. The process of claim 10 wherein the Brookfield viscosity of the suspension medium during reaction of the organophilic species is maintained between about 5,000 and about 30,000 cps.

13. The process of claim 1 wherein an organophilic monomer having a Tg between about −50° C. and about −100° C. is employed.

14. The process of claim 1 wherein the organophilic monomer is an alkyl substituted acrylate.

* * * * *